(No Model.)
J. A. HANCE.
TROLLEY.
No. 570,475. Patented Nov. 3, 1896.
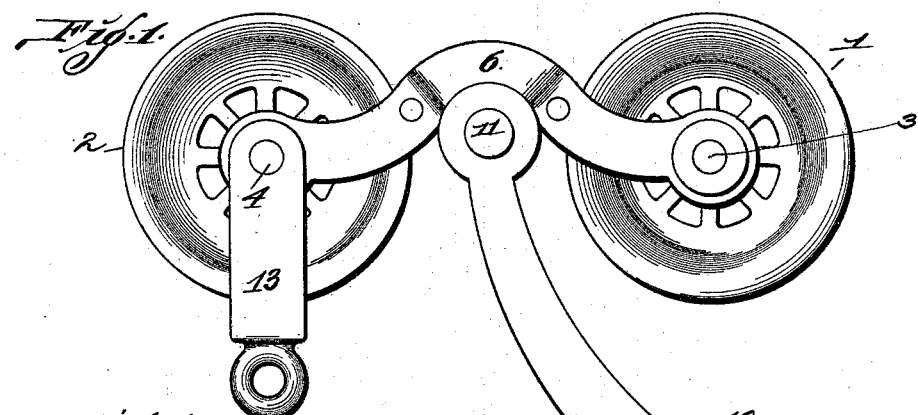
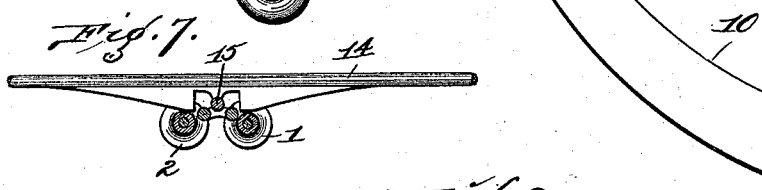
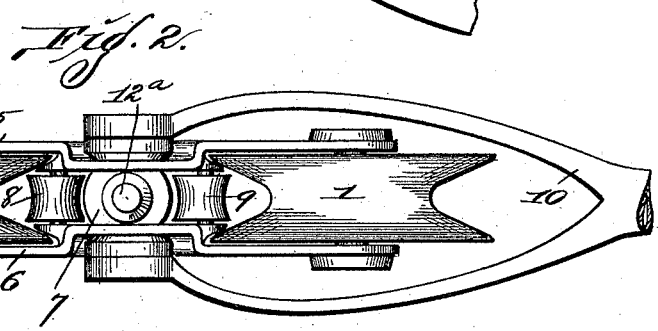
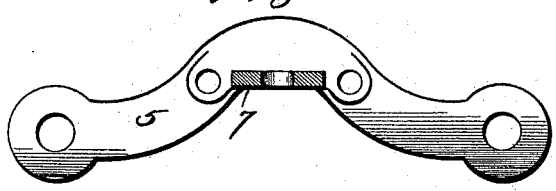
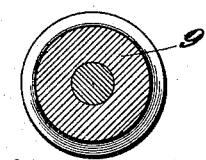
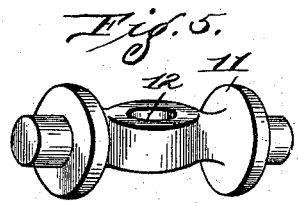
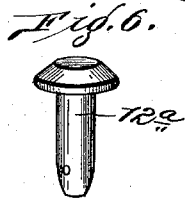
Attest:
M. P. Smith
S. G. Wells
Inventor:—
James A. Hance.
By Higdon & Higdon & Longan
Attys.

UNITED STATES PATENT OFFICE.

JAMES A. HANCE, OF ST. LOUIS, MISSOURI, ASSIGNOR OF ONE-HALF TO ANDREW B. LAIL, OF SAME PLACE.

TROLLEY.

SPECIFICATION forming part of Letters Patent No. 570,475, dated November 3, 1896.

Application filed February 26, 1896. Serial No. 580,891. (No model.)

*To all whom it may concern:*

Be it known that I, JAMES A. HANCE, of the city of St. Louis, State of Missouri, have invented certain new and useful Improvements in Trolleys, of which the following is a full, clear, and exact description, reference being had to the accompanying drawings, forming a part hereof.

My invention relates to an improved trolley-truck; and it consists in the novel construction, combination, and arrangement of parts hereinafter described and claimed.

In the drawings, Figure 1 is a side elevation of my improved trolley-truck. Fig. 2 is a top plan view. Fig. 3 is a sectional detail showing one side of the frame and the central transverse connection between the frames. Fig. 4 is a sectional detail of a grooved roller or wheel and spindle used in my improved trolley-truck. Fig. 5 is a perspective of a part of the swivel used in my truck. Fig. 6 is a perspective of the king-bolt. Fig. 7 is a diagrammatic view illustrating the use of my improved trolley-truck where two electric trolley-wires cross.

As shown in Fig. 2, my improved trolley-truck is a four-wheel truck designed for use on electric cars and on the upper end of a trolley-pole and in contact with the trolley-wire. There are two large grooved wheels 1 and 2 mounted on the spindles 3 and 4. These spindles are mounted in and connected by a frame comprising the side bars 5 and 6, which side bars are connected at the center by a plate 7. (Shown in plan in Fig. 2 and in section in Fig. 6.) Between the wheels 1 and 2 inside of said frame and in the same running line are mounted two small grooved wheels 8 and 9. A bifurcated truck-support 10 connects the truck with the pole of the car. Between the bifurcated ends of this support is journaled an axle 11, having an aperture 12 in its center, as shown in Fig. 5. The plate 7 rests upon the axle 11 and is swiveled thereto by the king-bolt 12ª. (Shown in perspective in Fig. 6.) Depending from the spindle 4 is a link 13, to which may be attached a cord for controlling the truck.

In Fig. 7 is shown the crossing of two trolley-wires 14 and 15 in the ordinary way for the purpose of illustrating one of the principal advantages of my device. From an inspection of this view it will be apparent that my truck will cross a wire arranged as in Fig. 7 without breaking the circuit, and electricians will recognize this as a decided advantage over the old device.

In the operation of my improved trolley-truck the wheels 1 and 2 are pressed against the trolley-wire in the ordinary way. The rocking swivel connection between the truck and the trolley-pole gives an almost universal motion to the truck, thus enabling it to follow crooks and turns and make crossings, such as shown in Fig. 7, without the liability of jumping from the wire and breaking the electric circuit. The wheels 8 and 9 are used only in making a crossing, the object being that while the front wheel is out of contact with the trolley-wire the smaller wheel behind said front wheel will be in contact and keep the circuit closed.

My trolley-truck is so constructed that when a wire crossing, such as is shown in Fig. 7, is approached the front wheel is prevented from flying upwardly and contacting with the cross-wire by one of the wheels 8 or 9 contacting with the line-wire until the front wheel has passed under the cross-wire. In other words, when one of the large wheels runs off of the end of the conductor, the truck will raise slightly and the small wheel immediately behind the wheel which has run off will contact with the conductor and prevent the wheel ahead of it from flying up and striking the cross-wire. The object in such a case is to make a continuous contact during the act of crossing and at the same time do away with the necessity of manipulating the trolley-pole by the depending cord, as is the case in the old devices.

A trolley-truck of my improved construction possesses many advantages over a truck having a single wheel.

I claim—

In a trolley-truck, two grooved wheels mounted for rotation in a frame, two smaller grooved wheels mounted for rotation in said frame and between the first two wheels, all of said wheels being in a running line and the top of the two intermediate wheels being slightly below the line of the top of the two outer wheels, and a rocking and swivel connection between said frame and the trolley-pole.

In testimony whereof I affix my signature in presence of two witnesses.

JAMES A. HANCE.

Witnesses:
M. P. SMITH,
MAUD GRIFFIN.